(12) United States Patent
Diffie et al.

(10) Patent No.: US 7,552,469 B2
(45) Date of Patent: Jun. 23, 2009

(54) METHOD FOR GENERATING MNEMONIC RANDOM PASSCODES

(75) Inventors: Whitfield Diffie, Woodside, CA (US);
William A. Woods, Winchester, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 371 days.

(21) Appl. No.: 11/472,929

(22) Filed: Jun. 22, 2006

(65) Prior Publication Data

US 2007/0300076 A1    Dec. 27, 2007

(51) Int. Cl.
*H04L 29/00* (2006.01)
(52) U.S. Cl. .................. 726/6; 726/2; 726/18; 726/19; 713/183; 713/184
(58) Field of Classification Search .............. 726/2, 726/6, 18, 19; 713/183, 184
See application file for complete search history.

(56) References Cited

U.S. PATENT DOCUMENTS

| | | | | |
|---|---|---|---|---|
| 5,828,991 A * | 10/1998 | Skiena et al. | .................. | 704/9 |
| 5,892,470 A * | 4/1999 | Kusnick | ...................... | 341/106 |
| 5,938,768 A * | 8/1999 | Brennan | ...................... | 726/18 |
| 6,643,784 B1 * | 11/2003 | McCulligh | .................. | 726/18 |
| 7,219,368 B2 * | 5/2007 | Juels et al. | ...................... | 726/2 |
| 7,299,359 B2 * | 11/2007 | Hurley | ........................ | 713/182 |
| 2005/0071686 A1 * | 3/2005 | Bagga et al. | ................. | 713/202 |
| 2006/0026439 A1 * | 2/2006 | Moseley | ...................... | 713/184 |

* cited by examiner

*Primary Examiner*—Carl Colin
(74) *Attorney, Agent, or Firm*—Osha • Liang LLP

(57) ABSTRACT

A method for generating a word sequence for a passcode involves choosing a schema to guide the generation of the word sequence, and transforming the passcode into the word sequence using the schema, wherein the word sequence contains mnemonic structure.

19 Claims, 5 Drawing Sheets

METHOD FOR GENERATING MNEMONIC RANDOM PASSCODES

BACKGROUND

Increasingly, people are required to remember passwords in order to access computer services. For some security applications, for example, it is desirable to have encryption keys as large as 128 bits or more. For many people, such random passwords are hard to remember. When users have trouble remembering random passwords, they typically write the passwords down somewhere or otherwise store the passwords, compromising the security of the password.

A direct approach to this problem is to assign one or more English code words to each bit pattern of a fixed number of bits. Then a passkey can be decomposed into segments of the corresponding number of bits, and each segment can be represented by the word with the corresponding bit code. For example, with a word list 16,384 (i.e., 2^14) words, a user could assign a unique word to each 14-bit pattern and generate a mnemonic by segmenting the key into 14-bit segments and representing each such segment with the word associated with that bit pattern. As example passage generated in this manner for a 126-bit key and 14 bits per word from a list of 16,384 words may be:

"whisky difficulty imported expected alchemistical clawed alate fascistic gangling"

While this is definitely easier to memorize than a 126-bit key, the above generated mnemonic is still a random word sequence, and memorizing random word sequences, where the words have no relationship to each other, is still a difficult task.

SUMMARY

In general, in one aspect, the invention relates to a method for generating a word sequence for a passcode. The method comprises choosing a schema to guide the generation of the word sequence, and transforming the passcode into the word sequence using the schema, wherein the word sequence contains mnemonic structure.

In general, in one aspect, the invention relates to a computer readable medium comprising software instructions for generating a word sequence for a passcode, the software instructions comprising functionality to choose a schema to guide the generation of the word sequence, and transform the passcode into the word sequence using the schema, wherein the word sequence contains mnemonic structure.

In general, in one aspect, the invention relates to a method for generating a word sequence for a passcode, comprising defining a schema for the word sequence, wherein the schema comprises at-least one open category corresponding to at least one of a plurality of word categories, constructing a word list comprising a plurality of words for the at least one of the plurality of word categories, assigning a bit pattern to each of the plurality of words in the word list, and generating the word sequence using the schema, wherein the word sequence comprises mnemonic structure.

Other aspects of the invention will be apparent from the following description and the appended claims.

DETAILED DESCRIPTION

Figure 1:
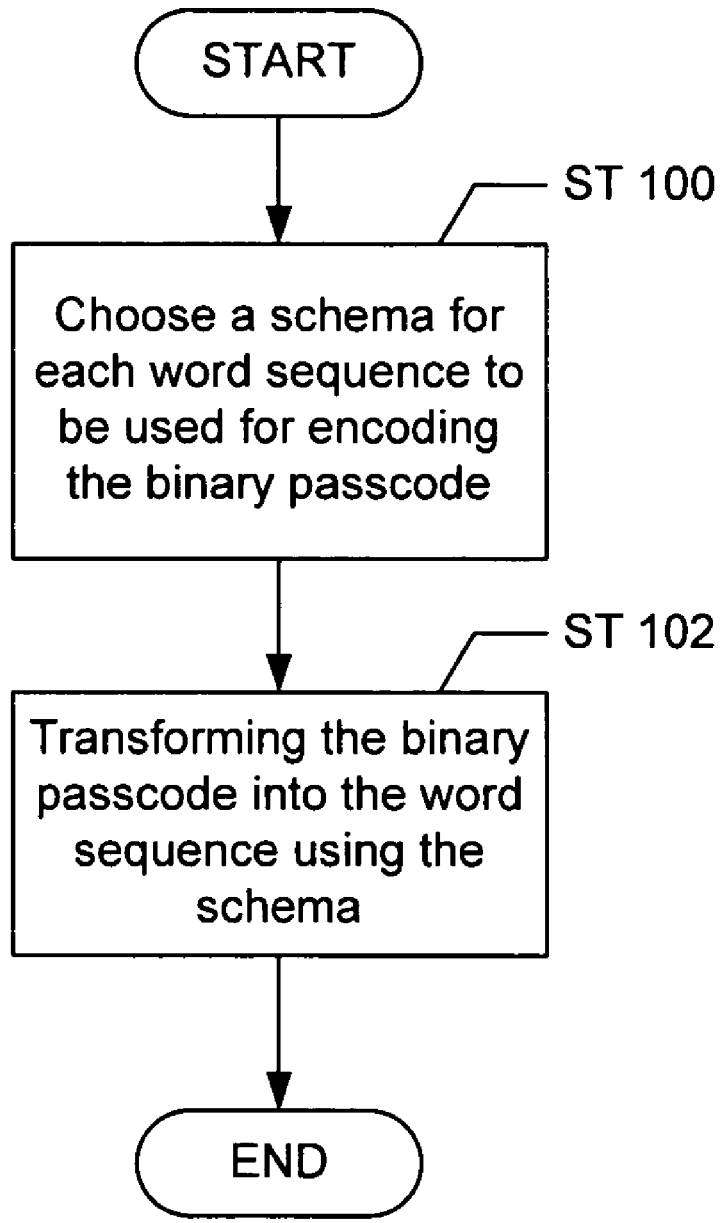
FIG. 1 shows a flow chart for generating a word sequence in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method for generating a word sequence for a passcode that is easily remembered by users. More specifically, embodiments of the invention relate to using elements of mnemonic structure such as natural language syntax and selective vocabulary to generate a word sequence representing a passcode. Further embodiments of the invention relate to using poetic elements, such as rhythm and rhyme to transform a passcode into a word sequence that is more easily memorized and can be easily decoded into the original passcode.

Embodiments of the invention provide methods for transforming passcodes into word sequences with mnemonic structure. More specifically, embodiments of the invention add mnemonic structure to a word sequence in order to make the word sequence more easily memorizable. Word sequences may include synthetic words (i.e., nonsense words that have no real meaning in the language of the words), or actual words. Mnemonic structure may include any pattern structure that may make the word sequence more memorable. For example, natural language structure, both syntactic and semantic, and prosodic structure, such as rhythm, rhyme, and melody, may be used to make word sequences more memorable. Syntactic structures are language structures that conform to the general syntax rules of the language. Semantic structures are structures that pertain to the meaning of a language. To illustrate an example of semantic structure, consider using the schema animal location, animal location, to generate word sequences consisting of pairs of animal categories followed by place descriptions, such as "dog house, snake pit," "lion campus, buffalo alcove," etc. In one embodiment of the invention, natural language structures include passages with syntactic structure, semantic structure, and/or punctuation structure. Further, word sequences may be sentences in iambic pentameter, poems, jingles, etc. Particularly, because songs, limericks, sentences in iambic pentameter, etc., include words along with some melody or rhythm, this has a psychological effect on the human mind that may allow humans to more easily remember a word sequence that includes such characteristics. Further, for many people songs and/or melodious/rhythmic passages contain meaning either on an individual or societal/cultural level. Thus, many people can emotionally or psychologically relate to the word sequences. Thus, word sequences generated with melodious and/or rhythmic characteristics may enable people to remember the passcodes more easily.

Embodiments of the invention also provide methods for efficiently transforming the word sequences back to the original passcode. Those skilled in the art will appreciate that a passcode may be any arbitrary passcode. Any passcode can be expressed as a binary passcode (i.e., a code sequence made up of binary digits (e.g., zeros and ones), e.g., a 128-bit encryption key, a 126-bit combination code, a password, an encrypted, compressed secret, etc.). Thus, those skilled in the art will appreciate that while the remainder of this disclosure refers to passcodes as binary passcodes, a passcode may be expressed in any arbitrary manner (e.g., ASCII). Further, those skilled in the art will appreciate that although the discussion that follows describes word sequences generated in English, the word sequences generated using methods of the present invention may be in any language.

In one embodiment of the invention, a grammar or a template to generate word sequences that decode to the specified passcode may be used. For example, in one embodiment of the invention, words may be chosen to fit the open categories of a template. Here open categories are categories of words that need to be filled in the schema. For example, an open category may correspond to a noun, an adjective, a verb, etc. Each open category is filled by taking the next k bits of the passcode (where k is determined as the number of bits required to distinguish the members of the open category being used) and selecting the word corresponding to that pattern of k bits. For example, if the template is:

"The adj noun did it with an adj noun in the adj noun noun room,"

and if there are 512 (i.e., 2^9) words in the adj category and 1024 (i.e., 2^10) words in the noun category, then the first 9 bits of the passcode may be used to select the word for the first adj category in the template, and the next 10 bits will be used to select the word for the subsequent noun from the noun category, etc.

In one embodiment of the invention, a grammar may be used to generate one or more sequences of words and word categories that would parse as a natural language sentence and whose length is such that the number of bits represented by the open categories will cover the number of bits to be transformed. This sequence of words and word categories is then used in the same way as the template to select words for the open categories determined by the bits to be transformed.

FIG. 1 shows a flow chart for generating a word sequence in accordance with one embodiment of the invention. Initially, a schema is chosen for each type of word sequence that may be used to transform a binary passcode (Step 100). As noted above, types of word sequences may include, for example, a poem, a grammar, a sentence in iambic pentameter, a limerick, a song, rhyming passages, and/or combinations of the above types of word sequences. Those skilled in the art will appreciate that word sequences may be any other type of passage that includes characteristics that allow the passage to be easily remembered by a user. Those skilled in the art will appreciate that the term "schema" as used herein may include any kind of pattern, template, or grammar that may be used to characterize a class of word sequences and word categories.

In one embodiment of the invention, a schema corresponding to a type of word sequence defines the structure of the word sequence. Further, the schema includes a set of predetermined words strategically placed in the word sequence that the schema corresponds to. Said another way, the schema determines which literal words and which word categories (i.e., nouns, adjectives, verbs, adverbs, etc.) are used to generate the word sequence and to decode the word sequence to obtain the binary passcode. Those skilled in the art will appreciate that word categories may be further specialized to include restrictions on the number of syllables and the stress or intonation patterns of the words. For example, a schema that may be pre-defined for a limerick word sequence may be as follows:

An adj2 adj2 noun2
An adj2 adj noun2 of mine
Took an adj2 adj noun2 to dine
The adj noun2 ate
everything on his plate
and he met his adj noun2 at nine.

In this case, the word categories "adj2" and "noun2" are categories of adjectives and noun that have two syllables and have the primary stress on the first syllable. In one embodiment of the invention, as shown in the schema above, the rhyming words at the end of each line are pre-determined and set in the schema for the limerick. Thus, the schema defines the structure of the word sequence, and for the example above, the schema is a limerick schema. The last step in the process is to transform the binary passcode into the word sequence using the chosen schema (Step 102).

Figure 2A:
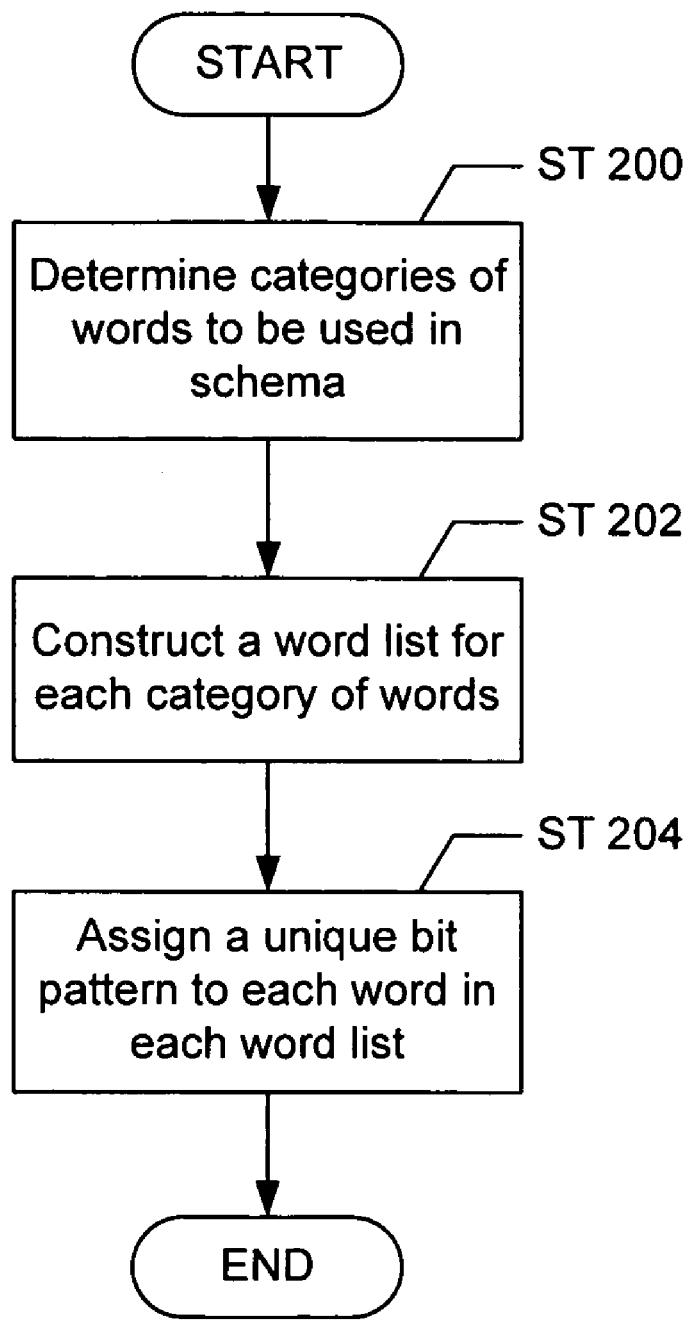
FIG. 2A shows a flow chart for setting up the transformation of a binary passcode into a word sequence in accordance with one embodiment of the invention.
Figure 2B:
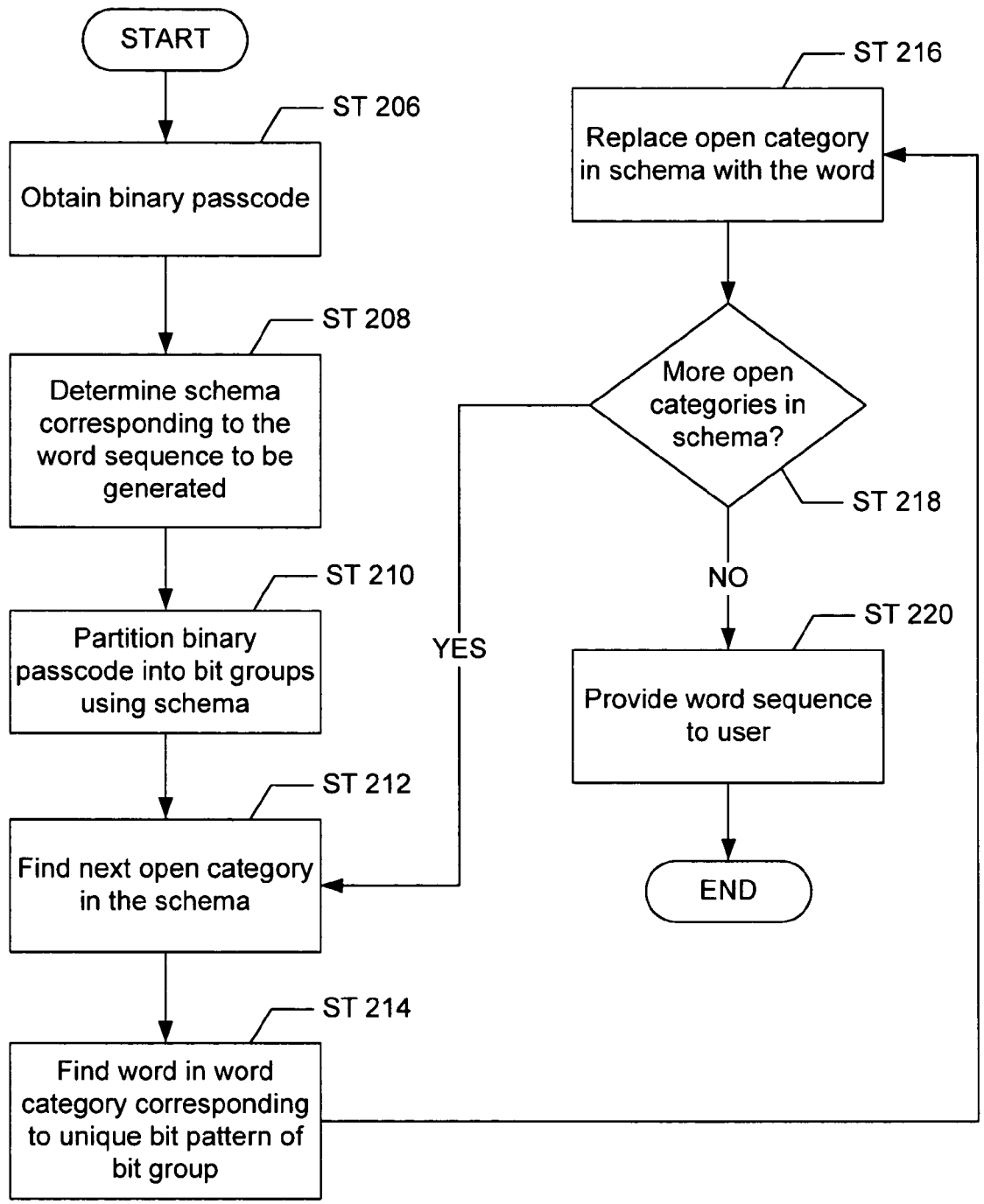
FIG. 2B shows a flow chart for transforming a binary passcode into a word sequence in accordance with one embodiment of the invention.

FIGS. 2A and 2B show flow charts for transforming a binary passcode into a word sequence in accordance with one embodiment of the invention. Specifically, FIG. 2A shows the set up process for transforming a binary passcode into a word sequence in one embodiment of the invention. Initially, the categories of words to be used in each schema is determined (Step 200). As mentioned above, categories of words, such as nouns, adjectives, verbs, nouns with two syllables, etc., are used to specify which words in a schema are to be replaced with a word from one or more of the word categories. Subsequently, a word list is constructed for each word category determined in Step 200 (Step 202). In one embodiment of the invention, word sequences are generated using a selective vocabulary to enable a user to memorize the word sequence more easily. Thus, the word list constructed for each word category includes several words from a specifically selected set of words (e.g., words that are less than a particular number of characters, words that are easy to pronounce, etc.). In one embodiment of the invention, each word list includes a power of two (i.e., ^x) number of words.

Those skilled in the art will appreciate that although the remainder of this disclosure assumes that a power of two number of words in used in each word list, and that no two word lists share any words, this is not an essential feature of the invention. Thus, several word lists for each type of word category may be generated with a different number of words in each word list. For example, two or more word lists for monosyllable nouns may be generated, with each word list containing a different number of words (e.g., one word list with 1024 words (2^10), one word list with 512 words (2^9), etc.). In one embodiment of the invention, depending on how the binary passcode to be transformed is partitioned into bit groups, a different word list for a word category may be used (as discussed below in FIG. 2B).

Finally, a unique bit pattern is assigned to each word in each word category (Step 204). In one embodiment of the invention, the number of bits in the bit pattern assigned to the words in a particular word category depends on how many bits it takes to distinguish the members of the word category.

For example, if a word category includes 512 words, (i.e., 512=2^9), then each word in that word category is assigned a unique bit pattern of nine bits. In one embodiment of the invention, the bit patterns are associated with words in each word category using a data structure, e.g., a hash table, a linked list, an array, etc.

Those skilled in the art will appreciate that restricted semantic categories of words may be used to generate word sequences that are less random in content. This may result, however, in much smaller sets of possible choices for each word category, and consequently, longer word sequences would need to be generated to cover the same number of binary digits.

FIG. 2B shows a flow chart for transforming a binary passcode into a word sequence using the set up described in FIG. 2A in accordance with one embodiment of the invention. Initially, a user obtains a binary passcode (Step 206). The binary passcode may be issued by a computer or some other source. For example, the binary passcode may be an encryption key provided to the user by a computer system. Subsequently, the schema corresponding to the type of word sequence to be generated is selected (Step 208). In one embodiment of the invention, a portion of the binary passcode (e.g., the first two bits of the binary passcode) may determine the schema that is selected for transforming the binary passcode. For example, if the first two bits of the binary passcode are 11, then this may correspond to a particular limerick schema.

Those skilled in the art will appreciate that any number of bits located anywhere in the binary passcode may indicate the schema to be used to transform the binary passcode into a word sequence. In one embodiment of the invention, the user may select the type of schema to be used based upon the type of word sequence desired. Alternatively, a computer system may choose the schema randomly or according to some criterion such as information about user preferences. Further, the computer or the user may select a category of schemata from which further choices may be made by using some bits from the binary passcode. For example, if a user can more easily memorize a song or a poem, then the user may choose that a schema for a song or poem be used to generate a word sequence corresponding to the passcode.

Upon determining the schema, the remaining bits of the binary passcode (not used in selecting the schema) are partitioned into bit groups, which match the number of words in each word category in the schema for each open category (Step 210) (as described in the example below). At this stage, the schema is scanned to determine the first open category in the schema (Step 212). As described above, an open category is a category that is not filled with a word in the schema. Upon determining the word category for the first open category, a word in the word category corresponding to the first open category in the schema is found, where the word has been assigned the exact same bit pattern as the corresponding bit group of the binary passcode (Step 214). The word that is assigned the same bit pattern as the first bit group of the binary passcode is then inserted into the open category of the schema (Step 216).

Subsequently, a determination is made as to whether more open categories in the schema exist (Step 218). If more open categories exist, then Steps 212-216 are repeated for each open category in the schema. If additional open categories do not exist in the schema, then this implies that the schema is complete with words for each open category that existed in the schema. Thus, the completely generated word sequence based on the schema determined by the binary passcode is provided to the user (Step 220).

Those skilled in the art will appreciate that the resulting word sequence may not be exactly the same number of bits as the binary passcode. For example, if the initial two bits of a binary passcode designates a schema that corresponds to a larger number of total bits than the length of the binary passcode, then a random number of bits may be chosen to fill out the binary passcode and generate a word sequence that decodes to the expanded binary passcode. Subsequently, upon decoding the binary passcode, only the original number of bits that made up the binary passcode may be used, and the other bits may be discarded.

In one embodiment of the invention, the method described in FIG. 2B may be altered such that every word in the schema is an open category. In this case, all of the words in a word sequence contribute bits to the decoded bit string, so that fewer words are required to cover a given number of bits. Further, in one embodiment of the invention, the words in the word categories may be chosen so that the categories are not overlapping, and thus, it may not be necessary to determine the category of a word in order to decode the word. Thus, there is no need to identify the original schema when decoding the word sequence.

In one embodiment of the invention, the computer may generate multiple different passages from the same key using different schemata and let the user choose. In this case, a user can choose any of a variety of schemata to generate a poem, song, sentence, etc., that covers the desired number of bits in the binary passcode being transformed. Using this method, each schema may be decoded in the same manner.

To illustrate the process shown in FIG. 2B, consider an example 128-bit binary passcode as follows:

1 1 1 1 1 0 1 0 0 0 1 0 0 1 1 0 1 0 0 0 1 1 0 1 1 1 1 1 0 1 1
0 1 1 0 0 0 0 1 0 1 0 1 0 1 1 0 1 1 0 0 0 1 1 1 1 0 1 0 1 1
0 0 0 1 0 1 1 1 0 1 1 1 1 0 0 1 0 1 1 1 1 1 0 0 1 1 1 0 0 0
0 1 1 1 0 1 0 0 1 0 0 0 1 0 0 0 1 0 1 1 1 1 0 0 1 1 0 1 0 1
0 0 0 0 1 0 1, where the binary passcode is partitioned as follows:

(1 1) (1 1 1 0 1 0 0 0 1 0) (0 1 1 0 1 0 0 0 1 1) (0 1 1 1 1 1
0 1 1 0) (1 1 0 0 0 0 1 0 1 0) (1 0 1 1 0 1 1 0 0) (0 1 1 1 1
0 1 0 1 1) (0 0 0 1 0 1 1 1 0 1) (1 1 1 0 0 1 0 1 1) (1 1 1 0
0 1 1 1 0 0) (0 0 1 1 1 0 1 0 0) (1 0 0 0 1 0 0 0 1 0) (1 1 1
0 0 1 1 0) (1 0 1 0 0 0 0 1 0 1), resulting in a binary passcode with the following number of bits in each bit group:

2 10 10 10 10 9 10 10 9 10 9 10 9 10

Consider further that the first two bits in the binary passcode (i.e., 11) correspond to the limerick word sequence schema mentioned above and reproduced below:

An adj2 adj2 noun2
An adj2 adj noun2 of mine
Took an adj2 adj noun2 to dine
The adj noun2 ate
everything on his plate
and he met his adj noun2 at nine.

Continuing with this example, in order to generate a limerick for transforming the binary passcode listed above, each open category (i.e., adj2, adj2, noun2, etc.) is replaced with a word from the corresponding word category that has the corresponding bit pattern. For example, in the title of the limerick, the first open category requires an adjective with two syllables and primary stress on the first syllable. The bit group of the binary passcode corresponding to this open category has 10 bits. Thus, the word that is assigned the same 10 bits (1 1 1 0 1 0 0 0 1 0) is selected from a two-syllable adjective word category that has 1024 (2^10) words in the category.

Similarly, the next open category also requires a two-syllable adjective assigned 10 bits, thus the same process is repeated. For the last word of the title, a two-syllable noun is required. Because the bit group from the binary passcode has 10 bits, the word in the noun2 word category with 1024 (2^10) words that is assigned the bit pattern for the third bit group (i.e., 0 1 1 1 1 1 0 1 1 0) of the binary passcode is inserted into the last open category in the title of the limerick. Those skilled in the art will appreciate that this process is repeated until all the open categories are replaced with words from corresponding word categories for each bit group of the binary passcode. In one embodiment of the invention, the resulting limerick produced using this method may be:

A shapely glossy mandrake
A portly shaped lustre of mine
Took a braided taught township to dine.
The dire mother ate
everything on his plate
and he met his tuned phosphate at nine.

Further, those skilled in the art will appreciate that although the above example used a limerick schema to generate a word sequence, any other type of word sequence may be generated using the method described above. For example, the method described above may be used to generate a song, rhyming sentences in iambic pentameter, haiku poems, word sequences with rhyming nonsense words, etc.

Those skilled in the art will further appreciate that if a word sequence is generated in English, then the word sequence should consider whether the English determiner "a" and "an" comes before a particular word in the word sequence. For example, if a word after a determiner placed in the schema of a word sequence starts with a vowel sound, then the determiner should an "an," while if a word starts with a consonant sound, then the determiner should be "a." For this case, in one embodiment of the invention, the algorithm checks whether the first letter of the subsequent word is a vowel, and if so, generates the determiner "an." Alternatively, if the first letter of the subsequent word is a consonant, then the algorithm generates the determiner "a." In one embodiment of the invention, the algorithm will be written such that it performs a more detailed analysis to consider special treatment for words beginning with, for example, "h" and "un" since "hour" starts with a vowel sound, while "unit" starts with a consonant sound. Those skilled in the art will appreciate that while we have only discussed the aforementioned two special cases, there are other words and phrases that may also be considered as special cases.

Figure 3:
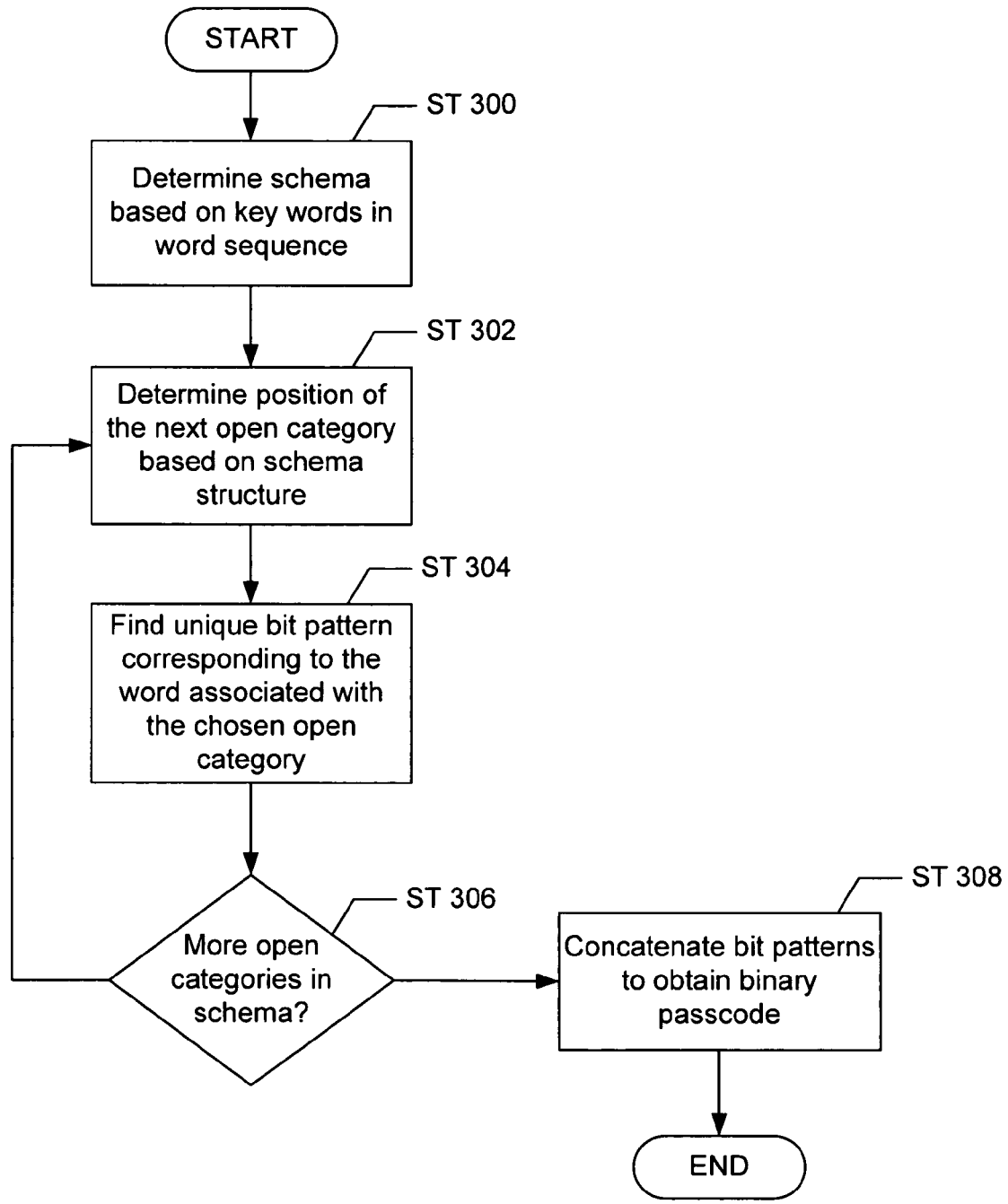
FIG. 3 shows a flow chart for decoding passcodes using word sequences in accordance with one embodiment of the invention.

FIG. 3 shows a flow chart for decoding a word sequence to obtain the original binary passcode in accordance with one embodiment of the invention. Initially, the schema used to transform the binary passcode into a word sequence is determined using key words in the word sequence (Step 300). For example, in the limerick example above, a designated key word may be the word 'mine' at the end of the first line of the limerick. More specifically, each schema may use designated specific key words that do not appear in any of the word lists for word categories and are not substrings of any of the words in the word lists for word categories or any of the other schema. In one embodiment of the invention, when a particular word sequence is encountered, the word sequence is simply searched for exactly one of these key words to determine which schema was used to generate the word sequence. Upon obtaining the schema, the overall passage appearance and which of its words correspond to the successive open categories in the schema can be easily determined. Thus, the next step is to determine the first open category in the schema based on the schema structure (Step 302). Subsequently, the unique bit pattern assigned to the word in the first open category in the schema is obtained using a hash table or any other type of data structure (Step 304).

At this stage, a determination is made as to whether any additional open categories remain in the schema (Step 306). If additional open categories exist, then Steps 302-304 are repeated for each open category in the schema. However, if no additional open categories exist in the schema, then the bit patterns obtained for the words inserted in each open category of the schema are concatenated to obtain the decoded binary passcode (Step 308).

Referring to the same example from above, when the generated limerick is decoded into the original binary passcode, the limerick is first inspected to determine the schema used to generate the word sequence by searching for key words in the word sequence (i.e., the keyword "mine" identifies a particular limerick schema in this case). Subsequently, the word (i.e., shapely) in the first open category (i.e., adj2) of the schema is determined. Upon determining the word "shapely," the word is found in the adj2 word category, and the unique bit pattern corresponding to the word "shapely" (i.e., 1 1 1 0 1 0 0 0 1 0) is obtained from a table or a data structure used to associated words with their unique bit patterns. At this stage, the unique bit pattern corresponding to the word "shapely" is stored by the program or computer decoding the word sequence, and the process is repeated for every open category in the limerick schema. Upon decoding each word in each open category, the unique bit patterns for each word in the limerick schema are concatenated to obtain the original binary passcode. In one embodiment of the invention, if none of a specific set of keywords is found in the passage, then the passage is decoded using every word of the passage and looking up the unique bit pattern associated with each word. In this case, the system does not need to know the schema that was used to transform the key into a word sequence.

In the embodiment just described, the rhyming words for the limerick were specified literally in the schema. In another embodiment of the invention, a more open class of rhyming words may be incorporated by using a special open category "rhymes." More specifically, when the algorithm encounters the open category "rhymes" in a schema, if this is the first or an odd numbered occurrence of this special category, then the next k bits of the code are used to choose a word from a special list of monosyllabic nouns that are known to have at least one rhyming partner in the list, where k is the number of bits required to distinguish the words in this special list. This word is then remembered until the next occurrence of the special category "rhymes" is encountered. When the second or any even numbered occurrence of the special category "rhymes" is encountered, no bits from the code are used, but a word that is different from, but which rhymes with, the remembered rhyming word is chosen. The original rhyming word can now be forgotten and the algorithm is now free to repeat this process for additional pairs of rhyming words. When decoding such a schema, whenever a word from the rhyming word list is encountered, if it is an odd numbered occurrence, then its bits are added to the accumulating code as usual, but if it is an even numbered occurrence, then it contributes no bits to the code.

Recognizing that a word is a rhyming word may be done by using a data structure such as a hash table and assuring that none of the words in the rhyming word list occur in any of the other word lists. Those skilled in the art will appreciate that this process may be generalized to allow other classes of rhyming words and more general rhyming patterns.

In one embodiment of the invention, rhythmic rhyming passages are generated without using word lists by composing nonsense words from simple syllables made up of alternating consonants and vowels. For example, using the consonant list b d f g h j k l m n p r s t v z (16 consonants=4 bits), and the vowel list a i o u (4 vowels=2 bits), a sequence of bits may be transformed by taking successive groups of six bits and encoding them with a two-letter consonant-vowel syllable. These syllables can be grouped into apparent words using a template to specify where to insert spaces between the "words" and rhymes can be arranged by remembering the vowel of the first rhyming word and repeating that same vowel (i.e., without consuming any bits) in the second rhyming word. For example, with a schema such as:

ss ss ss
ss ss r
ss ss ss
ss ss r, where s stands for an arbitrary syllable and r stands for a rhyming syllable, one can generate nonsense rhymes such as:

tado hasa raku
ligi bozi fo
budu pika kaha
ripi povi ko

In the above example, the first occurrence of r causes the system to remember the vowel (i.e., "o") of the syllable generated at that stage, and the second occurrence of r causes the system to use only four bits of the code to select a consonant, which is then combined with the remembered vowel. In one embodiment of the invention, the system may also remember the consonant (i.e., "f") of the first rhyming word, and would use only three bits of the code to determine the consonant of the second rhyming word, choosing the fourth bit in order to assure that the consonant of the second rhyming word is different from that of the first rhyming word.

In one embodiment of the invention, the schema used to generate the word sequence can be augmented with a musical annotation of a melody that can be associated with the generated word sequence. This can be as simple as an associated comment such as "sung to the tune of row row row your boat" or as complex as a full musical score. Thus, the resulting word sequence can be a song or jingle. In some cases, more than one alternative melody maybe suggested, or if the rhythm pattern is suitable for a melody, the user may simply make up a melody to associate with the word sequence. Those skilled in the art will appreciate that melody is an independent element that may be used with any combination of other mnemonic structure elements in which rhythm is present. Further, in one embodiment of the invention, a word sequence that uses known words in a natural language may be signed in sign language such as American Sign Language (ASL).

In one embodiment of the invention, the methods shown and described in relation to FIGS. 1-3 may be used so that a user can memorize a small number of high-security passcodes that could be used from memory without having to consult a written reminder. Such word sequences may be used, for example, to unlock a key chain of as many other high security passcodes and encryption keys as necessary, kept in a secure device, such as a Java™ card. The internal keywords in the Java™ card may be changed frequently as necessary, but the internal passcodes would not need to be remembered since they are used internally by the Java™ card. In this case, the mnemonic word sequence may be used to unlock the Java™ card.

Anything that can be expressed in binary can be transformed as a word sequence using the present invention. For example, in another application, the present invention may be used to transform an arbitrary secret of some significance to a user, e.g., names and addresses of important contacts, etc. In this case, the secret may be encrypted using a key and the resulting encrypted message can be transformed into a word sequence that can be written down in a form that is only understandable by the user (who knows the encryption key). The encryption key used to encrypt the secret may be remembered using this invention or can be stored in a safe keychain, such as a Java™ card. The word sequence may be viewed by others (e.g., the user may carry the secret written down without worry that the secret will be exposed).

The present invention includes the characteristic of using schemata, word lists, and algorithms that can be made public and assumed to be known by anyone. In general, only the original passcode and the resulting word sequence are kept secret. If the word sequence becomes known then anyone can decode the word sequence to obtain the original passcode. However, in an application of the invention where the algorithm is used to transform an encrypted secret into a sequence of words that can be more reliably read, copied, and maybe memorized, the resulting word sequence can also be safely written down and may be revealed to the public, since the underlying secret is encrypted and thus safe, even if the word sequence is decoded into its underlying binary sequence.

Figure 4:
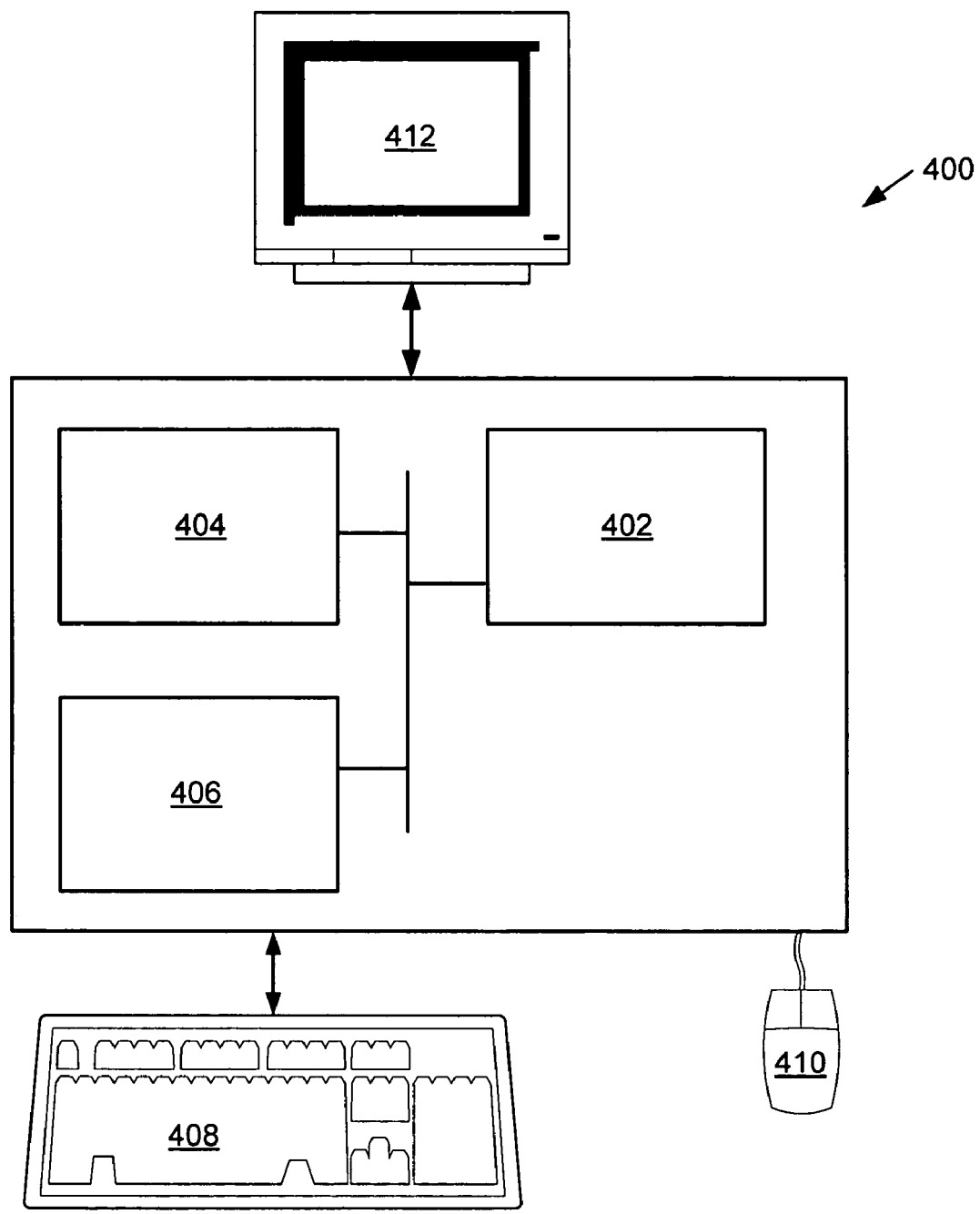
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) may be connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, or any other computer readable storage device.

Embodiments of the invention transform a passcode into a word sequence including mnemonic structure, such as rhythm, and rhyme such that the word sequence is easy to memorize by users. The invention increases security because users with a word sequences corresponding to one or more passcodes are less likely to write down or otherwise store the passcode where someone else may find and exploit the secure information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a word sequence for a passcode on a computer system, comprising:

choosing a schema to guide the generation of the word sequence, wherein the schema comprises a set of pre-determined words;

dividing the passcode into a plurality of bit groups, wherein a first bit group of the plurality of bit groups determines the schema chosen;

selecting a set of words from a word category, wherein the word category corresponds to the schema, and wherein the word sequence comprises the set of pre-determined words and the set of words from the word category; and transforming the passcode into the word sequence using the schema and storing the word sequence on a storage medium readable by the computer system, wherein the word sequence contains mnemonic structure.

2. The method of claim 1, further comprising:
decoding the word sequence using the schema.

3. The method of claim 2, wherein decoding the word sequence comprises:

determining the schema used to generate the word sequence using key words in the word sequence;

finding a bit pattern corresponding to at least one word in at least one open category of the schema; and providing the passcode to a user by concatenating the bit pattern corresponding to the at least one word.

4. The method of claim 1, further comprising:
obtaining the passcode generated by the computer system.

5. The method of claim 1, wherein transforming the passcode into the word sequence using the schema comprises:

determining at least one word category corresponding to at least one open category in the schema; and replacing the least one open category in the schema with a word selected from the at least one word category, wherein the bit pattern assigned to the word matches a corresponding one of the plurality of bit groups, and wherein the at least one word category comprises a number of words corresponding to the number of bits in one of the plurality of bit groups.

6. The method of claim 5, wherein the at least one word category comprises a power of two number of words.

7. The method of claim 1, wherein mnemonic structure comprises a pattern structure.

8. The method of claim 7, wherein the pattern structure comprises natural language structure.

9. The method of claim 8, wherein natural language structure comprises natural language semantics.

10. The method of claim 8, wherein natural language structure comprises natural language syntax.

11. The method of claim 8, wherein natural language structure comprises natural language punctuation.

12. The method of claim 7, wherein the pattern structure comprises prosodic structure.

13. The method of claim 12, wherein prosodic structure comprises rhythm.

14. The method of claim 12, wherein prosodic structure comprises rhyme.

15. The method of claim 12, wherein prosodic structure comprises melody.

16. The method of claim 1, wherein the schema corresponds to at least one selected from the group consisting of a poem, a song, a limerick, a sentence in iambic pentameter, a recognizable pattern structure, and a rhyming passage.

17. The method of claim 1, wherein the passcode corresponds to an encryption key.

18. The method of claim 1, wherein the word sequence comprises synthetic words.

19. A computer readable storage medium comprising software instructions for generating a word sequence for a passcode, the software instructions executable on a computer system and comprising functionality to:

choose a schema to guide the generation of the word sequence, wherein the schema comprises a set of pre-determined words;

dividing the passcode into a plurality of bit groups, wherein a first bit group of the plurality of bit groups determines the schema chosen;

selecting a set of words from a word category, wherein the word category corresponds to the schema, wherein the word sequence comprises the set of pre-determined words and the set of words from the word category;

transform the passcode into the word sequence using the schema, wherein the word sequence contains mnemonic structure: and store the word sequence in a form readable by the computer system.

* * * * *